June 2, 1953  I. I. SIKORSKY  2,640,469
COMBINED AIR FAN AND CLUTCH FOR ENGINE COOLING
Original Filed May 9 1945   3 Sheets-Sheet 1

IGOR I. SIKORSKY
INVENTOR

BY M. B. Tasker
ATTORNEY

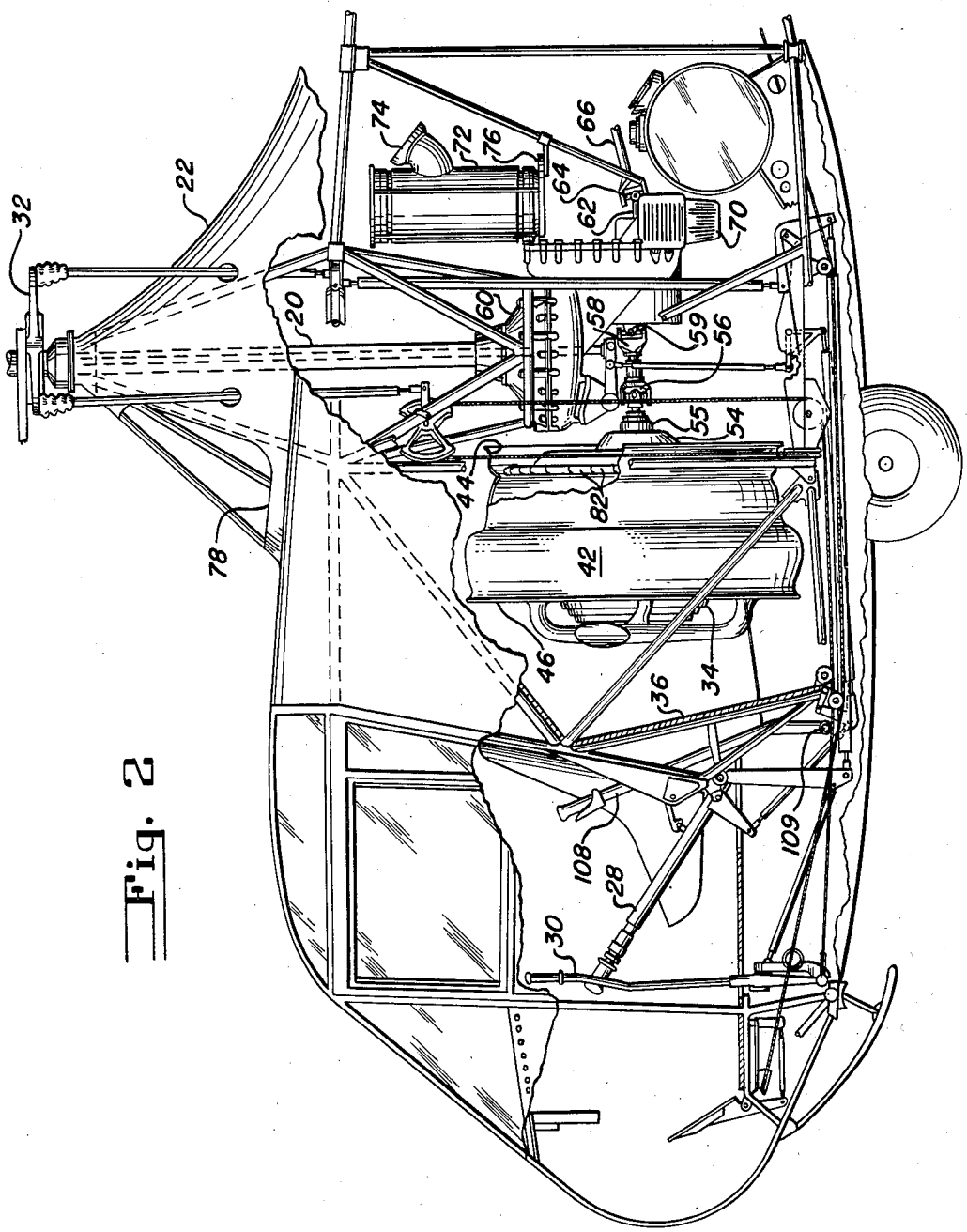

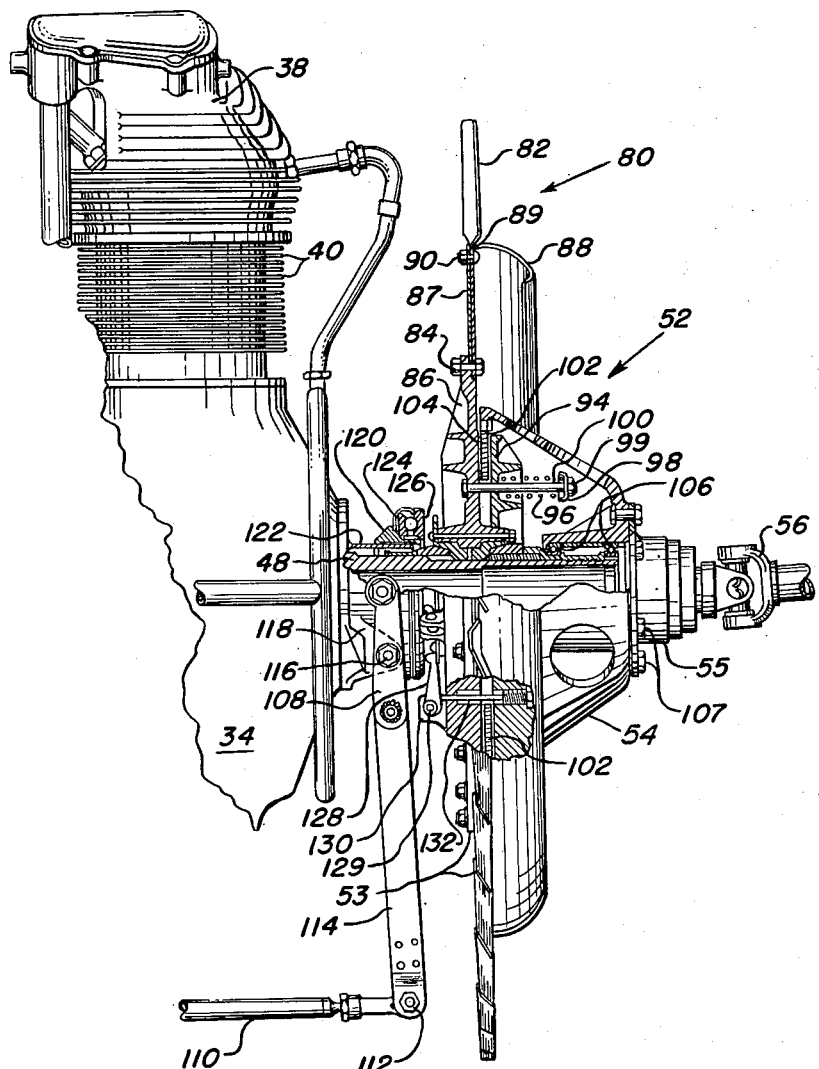

Patented June 2, 1953

2,640,469

UNITED STATES PATENT OFFICE 2,640,469

COMBINED AIR FAN AND CLUTCH FOR ENGINE COOLING

Igor I. Sikorsky, Bridgeport, Conn., assignor to United Aircraft Corporation, East Hartford, Conn., a corporation of Delaware Original application May 9, 1945, Serial No. 592,862, now Patent No. 2,517,509, dated August 1, 1950. Divided and this application May 20, 1949, Serial No. 94,441

13 Claims. (Cl. 123—2)

This application is a division of my copending application Serial No. 592,862, filed May 9, 1945, which issued on August 1, 1950, as Patent No. 2,517,509.

The present invention relates to improvements in aircraft, and more particularly to an improved aircraft of the direct lift type such as those shown in my prior patents, Nos. 2,318,259 and 2,318,260, and ordinarily referred to as helicopters.

It is an object of this invention to provide improved power transmission and engine cooling means for aircraft of this type.

A further object of the invention is to provide an improved combined engine power output clutch and engine cooling fan structure particularly adapted for use in aircraft.

The foregoing and other objects, including the details of construction and arrangement of parts of the instant invention, will be either obvious or pointed out in the following specification and claims taken in view of the accompanying drawings in which:

Fig. 2 is a side view of the front portion of the helicopter with parts broken away and parts in section to show the general construction and arrangement of the helicopter control and drive mechanisms;

Fig. 4 is a side view partly in section of the engine and my novel cooling fan and clutch mechanism for the engine.

Figure 1:
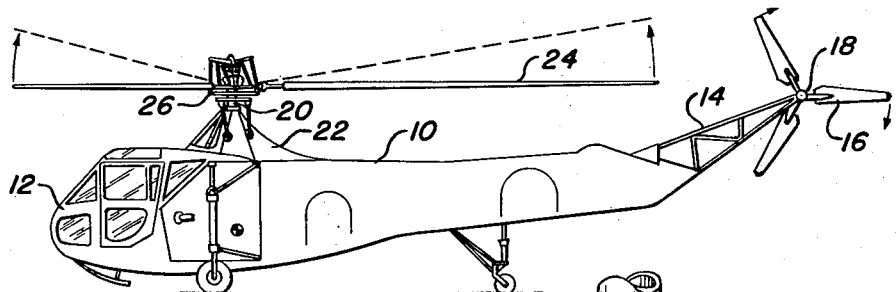
Fig. 1 is a side elevation of a helicopter embodying my invention.

As shown in Fig. 1, the helicopter embodying this invention includes an elongated body 10 having a forward pilot's compartment 12 in which the seats and controls are contained, and an empennage section 14 upon which a torque compensating tail rotor 16 is mounted for rotation about a generally horizontal axis 18. The main rotor for the helicopter is driven by an upright hollow drive shaft 20 which extends upwardly through a pylon 22 and drives a plurality of main rotor blades 24 which are pivotally mounted on a rotor head 26 for movement about flapping and drag hinges.

The usual controls for the rotor blades are provided including the collective control lever 28 (Fig. 2) and azimuthal control stick, or joy stick, 30 located in the pilot's compartment and connected through the usual control levers to a swash plate mechanism 32 comprising a part of the rotor head.

An engine 34 of the radial air cooled type is mounted in the body 10 just aft of a fire wall 36 which separates the engine compartment from the pilot compartment. The peripherally arranged cylinders 38 of the engine which are provided with the usual cooling baffles 40 are enclosed in a cowling 42 (Fig. 2) having an outwardly flared flange 44 facing aft in the fuselage and an air exit opening 46 facing forward.

The engine crankshaft 48 (Fig. 4) which extends aft in the fuselage carries a combined clutch and fan mechanism generally indicated by the numeral 52, the fan serving to circulate cooling air for the engine and the clutch serving to control the power output of the engine as developed at the engine crankshaft 48. This mechanism includes an assembly 53 of fan and clutch elements fixed to the crankshaft 48 and comprising the driving portion of the clutch and a bell-shaped element 54 rotatably mounted on the crankshaft and comprising the driven element of the clutch. The driven element 54 is connected through a free wheeling unit 55, universal joints 56 and 58, and a shaft 59 to the gear reduction mechanism 60 (Fig. 2) which may be of any suitable type, and in the instant device provides a gear ratio of 9.336/1 for driving the rotor shaft 20. A higher speed portion of the gear reduction mechanism turns a shaft 62 connected by universal joints 64 to the tail rotor drive shaft 66. An oil sump 70 is formed as a portion of the casing for the gear mechanism 60 and is equipped with fins for cooling the oil. An oil tank 72 which has a filling and air vent 74 is mounted upon a platform 76 carried by adjacent structural members of the fuselage.

Cooling air for the engine 34 is drawn into the interior of the fuselage 10 through an opening 78 in the forward portion of the pylon 22. The air travels downwardly and around the gear reduction mechanism 60 and is drawn forward through the engine cowling 42 by a fan 80 (Fig. 4) which comprises a plurality of blades 82, the shanks of which are rigidly connected by means of bolts 84 to the periphery of a plate member 86 comprising the main element of the driving portion 52 of the clutch. The air, after passing through the cowling 42, is directed downwardly and to the sides by the fire walls 36 and passes out of the fuselage through suitable holes, not shown.

The smooth flow of cooling air through cowling 42 and the cooling fins of engine 34 is enhanced by an annular baffle 87 which forms an extension of plate member 86 and terminates at its outer periphery in an aft directed, inwardly flared cowling ring 88. Ring 88 is conjunction with the outwardly flared flange 44 of baffle 42 defines an annular air inlet for the cooling airstream in which the blades 82 operate. Baffle 87 is secured at its inner periphery to the periphery of plate member 86 by the same bolts 84 by which the shanks of blades 82 are secured thereto. It will be evident from Fig. 4 that the shanks of blades 82, which lie adjacent and aft of baffle 87, extend through apertures 89 in the latter and are secured to the baffle at the base of ring 88 by a series of bolts 90.

Plate member 86 is rigidly secured to the engine shaft 48 by opposed annular wedge members fore and aft thereof and carries an annular pressure plate member 94 which surrounds the hub of plate member 86 and is constantly urged to the left as viewed in Fig. 4 by a plurality of compression springs 96, each of which bears at one end against plate 94 and at its opposite end against cup-shaped washers 98 secured by nuts 99 on one end of a bolt 100 carried by plate member 86. A clutch plate 102 is mounted between the driving clutch member and pressure plate 94 and cooperates with the adjacent face 104 of plate member 86. Clutch plate 102 comprises a flat annulus having its outer periphery toothed, or splined, to mesh with corresponding internal teeth, or splines, formed in the periphery of bell-shaped driven clutch member 54 which is rotatably mounted on the aft end of engine crankshaft 48 by means of spaced ball bearings 106. Clutch member 54 is connected to free wheeling unit 55 by a series of annularly disposed bolts 107.

Figure 3:
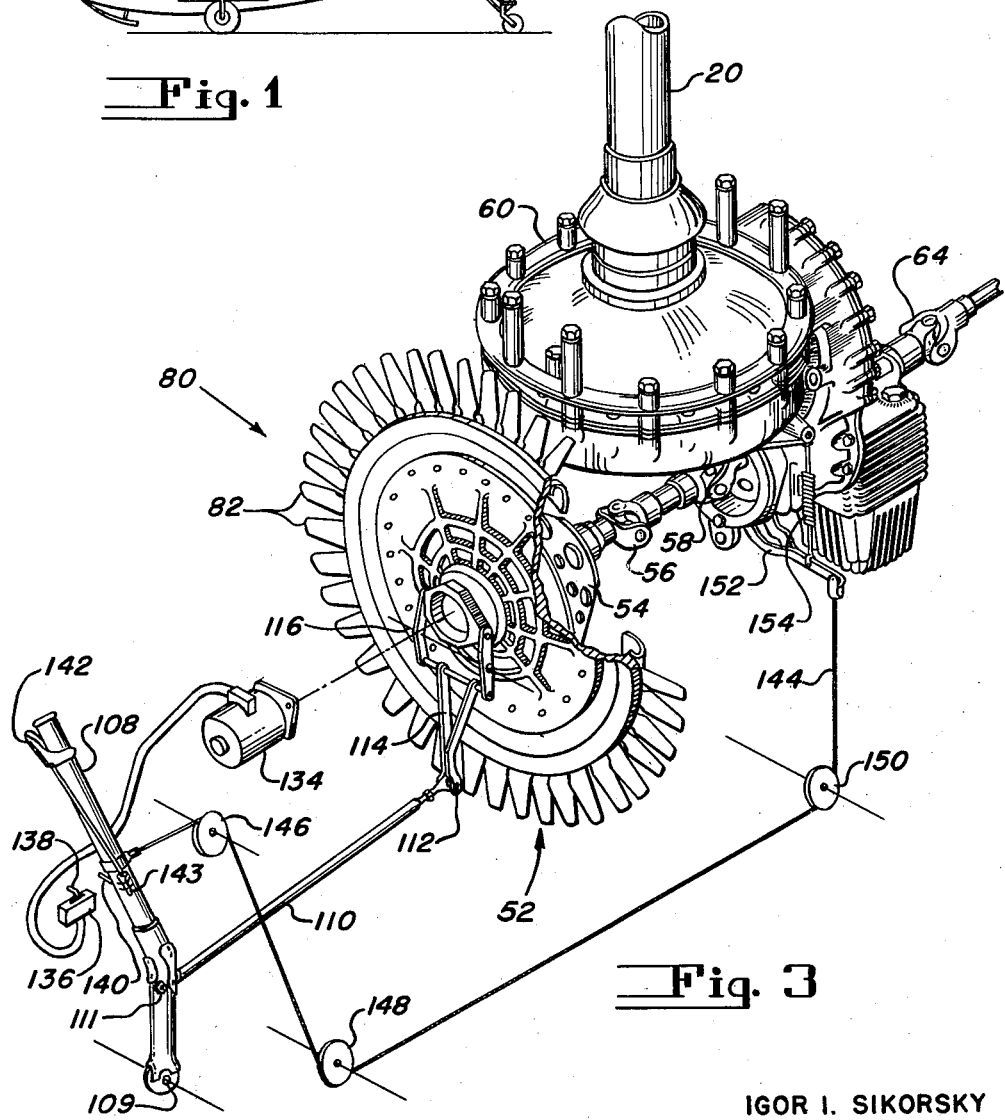
Fig. 3 is a perspective view of the reduction gear mechanism, the combined engine cooling fan and engine power clutch mechanism and the brake mechanism, the engine being omitted to facilitate illustration.

Control of the clutch is obtained by a manual control lever 108 (Fig. 3) located in the pilot compartment and pivoted to a fixed part of the craft at 109. Rod 110 pivotally connected to lever 108 at 111 is pivoted at 112 (Fig. 4) to the lower end of a yoke lever 114 pivoted at 116 on a lug 118 on the engine crankcase. The upper free ends of yoke lever 114 move a collar 120 fore and aft along the axis of engine shaft 48, the collar 120 being axially slidable along a coaxial tubular member 122 forming an integral part of the crankcase of the engine. Collar 120 is secured to one race 124 of a ball bearing and holds the same nonrotatable. Another race 126 of the bearing is free to turn, and engages the free ends of a plurality of levers 128 pivotally supported at their opposite ends at 129 on lugs 130 on plate member 86. Levers 128 engage a series of thrust pins 132 which are slidably extended through plate member 86, pass through the central opening in annulus 102 and are adjustably screw threaded into the pressure plate member 94.

An electrical starter 134 (Fig. 3) is connected by wires to a spring loaded switch 136 having switch operating lever 138 disposed in the path of a lug 140 which is attached to lever 108. A conventional manually operated starter switch, not shown, is in series with the spring loaded switch 136. Only when the lever 108 is in the full forward position so that lever 138 is held depressed by lug 140, can the starter circuit be closed by the conventional manual switch. When the lever 108 is fully forward, the clutch is in the disengaged position.

Lever 108 is also connected by a cable 144, which passes over a series of pulleys 146, 148 and 150, with the rotor brake operating lever 152, and is constantly biased into the clutch-engaging or brake releasing position by tension spring 154 acting on lever 152.

In operation the pilot squeezes the top of lever 108, which has pivoted on it a handle 142, and thereby withdraws lug 143 from engagement with a tooth quadrant (not shown). The lever 108 is moved in the forward direction until the lug 140 engages the switch operating lever 138 at which time the pilot can start the engine by operating the conventional starter switch. In this position the rotor brake will be engaged. After a sufficient period of warm up of the engine, the pilot moves the clutch control lever 108 aft to a mid position of its travel. At this point the rotor brake is released, while the clutch is still not engaged. By moving lever 108 further aft, the clutch is then gradually engaged and transmits the engine torque to start the rotor turning. After a sufficient period of warm-up of the engine, the pilot moves the clutch control lever 108 aft to first release the brake and then to gradually engage the clutch, utilizing his other hand to control the collective pitch control lever 28 and the engine throttle.

It will be noted from Fig. 4 that as the lever 108 is moved aft the yoke lever 114 moves counterclockwise about its pivot 116 which causes the collar 120 to be moved forward. This results in the forward movement of the free ends of levers 128 which control the thrust pins 132 and allow the latter and pressure plate 94 to move forward under the bias of clutch springs 96. As the pressure plate 94 moves forward (to the left in Fig. 4), it moves the clutch plate 102 to the left into engagement with the flat face 104 of the driving clutch member 86, thus connecting the latter with the driven clutch member 54 and establishing a driving connection through the clutch mechanism to the gear mechanism 60.

In order to get maximum efficiency, that is maximum torque capacity for a minimum overall weight of structure using either a disc clutch or a centrifugal type clutch, it has been found best to design these clutches on the basis of as large a diameter as possible. By mounting the cooling fan directly on the driving portion of the engine clutch, the fan is always rotated at engine speed, regardless of whether the rotor is turning, and provides in a helicopter the most advantageous location for mounting the cooling fan. Conversely, the cooling fan is best mounted near the engine and by my improved construction the clutch can be advantageously mounted on the engine shaft. By this arrangement such power consuming devices as accessory drives are eliminated. Maximum efficiency of both units is obtained as the large diameter of the clutch also provides a base for a large diameter cooling fan, and much of the undesirable weight heretofore considered necessary in helicopter transmissions where separate clutches and fans were used is eliminated.

While I have shown and described one illustrative embodiment of my invention, it will be evident that various changes in the construction and arrangement of the parts may be resorted to without departing from the scope of the invention.

I claim:

1. In a helicopter, an engine having radial air cooled cylinders, a rotor driven by said engine, cowling means surrounding said engine cylinders having an air inlet, a clutch disposed in said cowling inlet comprising a driving member connected to said engine and a driven member connected to said rotor for controlling the power output of said engine, and cooling fan blades carried by the periphery of said driving member.

2. In a helicopter including an engine having a crankshaft and radial air cooled cylinders, air passage means for directing a cooling airstream over said cylinders, a clutch having driving and driven members, said driving member being connected to said crankshaft and said driven member being rotatably mounted on said crankshaft, an inner cowling ring carried by said driving clutch member in spaced relation to the walls of said passage means, and a fan carried by said driving clutch member having blades rotatable in the annular space between the walls of said passage means and said inner cowling.

3. In a helicopter, an engine having radial air cooled cylinders, cowling means surrounding said engine cylinders having an air inlet, means for controlling the power output of said engine including a clutch disposed in said cowling inlet having driving and driven members, said driving member forming a central barrier in said air inlet, and cooling fan blades carried by the periphery of said driving member in the annular space between the latter and said cowling.

4. In a helicopter, an engine having air cooled cylinders, cowling means surrounding said engine cylinders having an air inlet, means for controlling the power output of said engine including, a clutch disposed in said cowling inlet having driving and driven members, said driving member forming a central barrier in said air inlet, cooling fan blades carried by the periphery of said driving member in the annular space between the latter and said cowling, and inner cowling means carried by said driving clutch member at the base of said fan blades.

5. In a helicopter, an engine, said engine having a crankshaft and air cooled cylinders extending radially from said crankshaft, cowling means surrounding said engine cylinders and having an air inlet for directing a cooling airstream over said cylinders, means for controlling the power output of said engine including a clutch comprising a driving clutch member disposed in said inlet and fixed to said crankshaft and a driven clutch member rotatable relative to said crankshaft, said driving clutch member having its outer periphery spaced from said cowling, and a cooling fan carried by said driving member including fan blades extended radially into the space between the periphery of said driving member and said cowling.

6. In a helicopter, an engine, said engine having a crankshaft and air cooled cylinders extending radially from said crankshaft, fixed cowling means surrounding said engine cylinders for directing a cooling airstream over said cylinders, means for controlling the power output of said engine including a clutch disposed in said cowling means comprising a driving clutch member fixed to said crankshaft and a driven clutch member rotatable relative thereto, said driving clutch member having its outer periphery spaced from said cowling means, cooperating rotatable cowling means carried by the periphery of said driving member and defining with said fixed cowling means an annular air passage for directing cooling air to the engine, and a cooling fan including blades attached to said rotatable cowling means and extended into said annular air passage.

7. In a helicopter, an engine, said engine having a crankshaft and air cooled cylinders extending radially from said crankshaft, cowling means surrounding said engine cylinders and having an air inlet for directing a cooling airstream over said cylinders, means for controlling the power output of said engine including a clutch disposed in said inlet comprising a driving clutch member fixed to said crankshaft and a driven clutch member rotatable relative thereto, said driving clutch member having its outer periphery spaced from said cowling means, radial fan blades having their shanks secured to said periphery and having blade portions located adjacent said cowling means, and rotating cowling means attached to said driving clutch member and located adjacent the shank portions of said blade, said rotating cowling means cooperating with said stationary cowling means to form an annular cooling air passage in which said blade portions operate.

8. In a helicopter, an engine having radial air cooled cylinders and an axial crankshaft, means for controlling the power output of said engine including a driving clutch member fixed to said crankshaft having an annular clutch face, a pressure plate carried by said driving clutch member having means constantly biasing it toward said clutch face, a driven clutch member rotatable relative to said crankshaft having a flange which terminates adjacent said driving clutch member, the periphery of said flange having an internally splined surface thereon, an annular axially floating clutch plate having an outer splined periphery meshing with the splines on said driven clutch member and overlying the clutch face on said driving clutch member between the latter and said pressure plate, and means for moving said pressure plate member against the bias of its springs to disengage said clutch.

9. A combined fan and clutch mechanism for a rotary wing aircraft of the type having an air cooled engine for driving the rotor, said combined fan and clutch mechanism including a clutch between the engine and the rotor for controlling the application of engine power to the rotor having driving and driven clutch members, means for directing a stream of cooling air over said engine including a streamlined annular passageway the outer wall of which is stationary and the inner wall of which is carried by one of said clutch members, and fan blades in said passageway carried by the periphery of said driving clutch member.

10. A combined fan and clutch mechanism for a rotary wing aircraft of the type having an air cooled engine including a crankshaft and cowling enclosing the engine forming air passage means for directing a cooling airstream over the engine cylinders, said combined clutch and fan mechanism including a driving clutch member driven by the crankshaft of the engine and a driven clutch member rotatable relative thereto, an inner cowling ring carried by said driving clutch member in spaced relation to the walls of said passage means, and a fan carried by said driving clutch member having blades rotatable in the annular space between the walls of said passage means and said inner cowling.

11. In a helicopter, an engine having air cooled cylinders, a rotor driven by said engine, streamlined cowling means having an air inlet and an air outlet discharging air over said cylinders, a clutch disposed in said cowling inlet comprising a driving member connected to said engine and a driven member connected to said rotor for controlling the application of engine power to said rotor, and cooling fan blades carried by the periphery of said driving member.

12. In a helicopter including an engine having a crankshaft and air cooled cylinders, air passage means for directing a cooling airstream over said cylinders, a clutch having driving and driven members, said driving member being connected to said crankshaft and said driven member being rotatably mounted on said crankshaft, an inner cowling ring having an exterior airfoil surface carried by said driving clutch member in spaced relation to the walls of said passage means, and a fan carried by said driving clutch member having blades rotatable in the annular space between the walls of said passage means and the airfoil surface of said inner cowling.

13. A combined fan and clutch mechanism for a rotary wing aircraft of the type having an air cooled engine including a crankshaft and cowling forming air passage means having an inner airfoil surface for directing a cooling airstream over the engine cylinders, said combined clutch and fan mechanism including a driving clutch member driven by the crankshaft of the engine and a driven clutch member rotatable relative thereto, an inner cowling ring having an exterior airfoil surface carried by said driving clutch member in spaced relation to the walls of said passage means, and a fan carried by said driving clutch member having blades rotatable in the streamlined annular space between the walls of said passage means and said inner cowling.

IGOR I. SIKORSKY.

References Cited in the file of this patent

UNITED STATES PATENTS

| Number | Name | Date |
|---|---|---|
| 911,382 | Choston | Feb. 2, 1909 |
| 1,422,426 | Farr | July 11, 1922 |
| 1,456,699 | Kramer | May 29, 1923 |
| 1,551,055 | Rieseler | Aug. 25, 1925 |
| 1,837,564 | McCaleb | Dec. 22, 1931 |
| 1,934,399 | Bleecher | Nov. 7, 1933 |
| 1,934,783 | Arterburn | Nov. 14, 1933 |
| 2,274,743 | Rosskopf | Mar. 3, 1942 |
| 2,379,015 | Lysholm | June 26, 1945 |
| 2,407,223 | Caldwell | Sept. 10, 1946 |
| 2,457,692 | La Brie | Dec. 28, 1948 |

FOREIGN PATENTS

| Number | Country | Date |
|---|---|---|
| 874,323 | France | Apr. 27, 1942 |
| 875,651 | France | June 29, 1942 |
| 315,877 | Italy | Mar. 10, 1934 |